United States Patent [19]
Burrow et al.

[11] Patent Number: 5,724,398
[45] Date of Patent: Mar. 3, 1998

[54] NUCLEAR FUEL ELEMENTS

[75] Inventors: Paul Burrow; Peter Fish, both of Preston, United Kingdom

[73] Assignee: British Nuclear Fuels plc, Warrington, United Kingdom

[21] Appl. No.: 616,322

[22] Filed: Mar. 15, 1996

[30] Foreign Application Priority Data

Mar. 16, 1995 [GB] United Kingdom .................. 9505302

[51] Int. Cl.$^6$ ........................................................ G21C 3/32
[52] U.S. Cl. ........................... 376/433; 376/427; 376/435; 376/447
[58] Field of Search ........................ 376/427, 429, 376/433, 435, 447

[56] References Cited

U.S. PATENT DOCUMENTS

| | | | |
|---|---|---|---|
| 3,945,884 | 3/1976 | Freck | 376/411 |
| 3,954,560 | 5/1976 | Delafosse et al. | 376/442 |
| 4,113,563 | 9/1978 | Tobin | 376/427 |
| 5,565,980 | 10/1996 | Davidson et al. | 376/248 |

FOREIGN PATENT DOCUMENTS

| | | |
|---|---|---|
| 673524 | 12/1964 | Belgium . |
| 1514489 | 6/1970 | Germany . |
| 873073 | 7/1961 | United Kingdom . |
| 937673 | 9/1963 | United Kingdom . |
| 944699 | 12/1963 | United Kingdom . |
| 1035150 | 7/1966 | United Kingdom . |
| 1157907 | 7/1969 | United Kingdom . |
| 1157979 | 7/1969 | United Kingdom . |
| 1202318 | 8/1970 | United Kingdom . |
| 1548302 | 7/1979 | United Kingdom . |
| 2043324 | 10/1980 | United Kingdom . |
| 2133918 | 8/1984 | United Kingdom . |
| 2181292 | 4/1987 | United Kingdom . |

*Primary Examiner*—Daniel D. Wasil
*Attorney, Agent, or Firm*—Sheridan Ross, P.C.

[57] ABSTRACT

A nuclear fuel element for use in a gas cooled nuclear reactor, such as a Magnox reactor, has a plurality of fuel pin supports defining an element axis passing through the supports. Suspended between the supports are a plurality of fuel pins formed by a stack of oxide fuel pellets within a metal tube. Connected between the supports are a number of elongate members, for example tubular rods, which extend parallel to the axis and are disposed around the fuel pins. One or more of the tubular rods incorporates a doping material, such as gadolinia.

24 Claims, 3 Drawing Sheets

NUCLEAR FUEL ELEMENTS

FIELD OF THE INVENTION

The present invention relates to nuclear fuel elements for use in gas cooled nuclear reactors.

BACKGROUND OF THE INVENTION

Early British nuclear reactors which are still in operation (and some reactors elsewhere) are of the so-called Magnox type. These are gas cooled reactors which operate using natural (i.e., unenriched) metallic uranium fuel rods. Each such rod comprises a single uranium body encased in a magnesium alloy jacket.

Subsequent generations of reactor have employed uranium oxide fuels. These include the so-called advanced gas cooled reactor, AGR, and the so-called light water reactor, LWR (which class includes the boiling water reactor, BWR, and pressurized water reactor, PWR). Oxide fuel reactors employ collections of fuel pellets held together in a jacket to form a pin, a collection of the pins being clustered together to form a fuel element and an arrangement of such elements being fitted together to form a fuel assembly. A multiplicity of fuel assemblies is employed together in a reactor.

In Magnox reactors a core is provided by provision of blocks of graphite moderator material having channels formed directly therein e.g., by machining. Assemblies of Magnox fuel elements are fitted directly in the moderator channels.

Uranium metal fuel used in Magnox reactors cannot be stored for an extended period of time and is currently reprocessed in a custom designed plant at the present assignee's Sellafield site. As some of the present generation of Magnox reactors reach the end of their operational life it will become very expensive in terms of unit product cost to produce, store and reprocess fuel for the remaining Magnox reactors.

The present invention provides, surprisingly, a way of using oxide fuel in Magnox reactors and therefore beneficially offers the possibility of extended life of Magnox reactors as well as cheaper fuel manufacture, longer fuel storage and more efficient and cheaper unit cost fuel reprocessing in a plant already operational for oxide reprocessing, such as at the present assignee's THORP plant.

SUMMARY OF THE INVENTION

According to the present invention in a first aspect there is provided a nuclear fuel element for use in a gas cooled reactor comprising a plurality of fuel pin supports defining an element axis passing through the supports, a plurality of fuel pins suspended between the supports and extending parallel to the axis and characterized by a plurality of elongate members connected between the supports, the elongate members extending parallel to the axis and being disposed around the fuel pins.

The fuel pins may be similar to the fuel pins conventionally used in AGR, i.e., containing a collection of oxide fuel pellets stacked inside an elongate metal tube to form the pin.

The elongate members may be rods, conveniently tubular rods.

The fuel pin supports may comprise constructions machined from a single plate or made from strip material, e.g., metal such as stainless steel, the sides of the strips being parallel to the axis of the support. Such constructions may provide apertures to receive and support the fuel pins, for example in the manner described hereinafter, and apertures to receive and support the elongate members. Such supports may be generally ring shaped. The apertures receiving the elongate members may be adjacent to the periphery of the support structure, for example provided by rings forming projections at the support periphery, for example projections from a circumferential ring around the axis of the support.

In this way, the elongate members suspended between the supports define a cage structure enclosing the fuel pins which provides protection to the enclosed and suspended pins and defines an envelope for the element in relation to a reactor core channel. Doping material, e.g., gadolinia, which may be employed in the form of thin walled cables, may conveniently be incorporated in the elongate members, where tubular, to facilitate achievement of the correct fission reaction. Gadolinia, for example, is known to act as a burnable poison in a reactor core, to provide an appropriate reaction especially where enriched $UO_2$ is employed as fuel (as in AGR fuel).

Fuel elements according to the present invention may therefore be fitted directly in place of alloy jacketed metal fuel rods in a reactor channel formed directly in a moderator core in a Magnox reactor. The elongate members allow fitting closely in the moderator channel of the element without localized blocking of the element in the channel during fitting operation or removal of the element. The elongate members may contain end plugs welded or swaged in their ends.

A reactor core may therefore include some or all fuel elements which are elements according to the present invention. Preferably, but not necessarily, where a mixture of conventional Magnox fuel elements and fuel elements according to the present invention are employed together in the same reactor a complete core channel includes elements all of the same fuel type.

The design of a suitable core loading pattern incorporating some or all fuel elements according to the present invention may be carried out by those skilled in reactor core design in a known way, e.g., using reactor physics modelling procedures.

The fuel element according to the present invention preferably includes supports which can accommodate from three to six fuel pins, e.g., by having six apertures equidistantly spaced on an arc around the axis of the pin support. In such an arrangement it is not essential for each aperture to accommodate an active fuel pin. For example, dummy pins, made for example of steel or preferably zirconium alloy which may not incorporate a hollow portion or fissile material, may be used together with active pins containing fissile material. There may for example be three active pins alternating around the arc with three dummy pins.

The apertures in the pin supports which locate and support the pins (either active or dummy pins) may be provided by pin locating projections pointing inward toward the center of each aperture. For example, the internal tips of a set of pin locating projections may be equidistantly spaced around a common arc thereby defining a circular aperture to be occupied by a fuel pin or a dummy pin as appropriate in contact with the projections. Each set of such projections may for example comprise two facing circumferentially pointing projections and two facing radially pointing projections.

Use of zirconium alloy components in the element has several benefits in use of the element in a reactor. Such components contribute to the weight of the element so that it approaches that of a Magnox element. Zirconium alloy dummy rods or pins produce increased gas flow velocity over the fuel pins by reducing the flow annulus available (this is the shape of the dummy pin not the material) to provide improved heat transfer characteristics while producing a small neutron absorption cross-section (smaller, for example, than that of steel). Preferably, the zirconium alloy includes from 0.4 to 0.7 atomic percent Cu and from 0.4 to 0.7 atomic percent Mo, the remainder being Zr.

Where the element according to the present invention includes six active and/or dummy pins in total it preferably includes six elongate members. Each pin may be on the same radius as each elongate member.

The element according to the present invention preferably includes a rod extending along the axis of the element between the fuel pin supports to enhance the strength and rigidity of the element structure. Such a rod may conveniently have complementary formations on its ends which permit location of one element against another on their axis to form a suitable row of such elements. Such formations conveniently are similar to those conventionally employed on the ends of Magnox fuel rods. Thus, the respective ends of the said axially extending rod may have end cap portions having complementary male and female mating surfaces (to mate with surfaces on rods of other elements). The mating surfaces may, for example, be conical. The end cap portions may conveniently be manufactured separately from the rod body and attached to the ends thereof by a known method of attachment. For example, the rod ends may be threaded and the caps may have internal threads which engage therewith. The end caps may also be secured in position on the ends of the rod by locking means, e.g., transverse dowel pins fitting through a blind locating hole passing through each end cap into the rod end inside. The rod may conveniently be made of stainless steel and the end caps may be made of zirconium alloy as described above.

The end caps may have a body shape which facilitates handling by existing Magnox fuel element handling equipment.

As well as the fuel pin supports described above the fuel element according to the present invention may comprise one or more auxiliary supports to hold the elongate members. For example, an element may include three fuel pin supports, a first adjacent to one end of the element, a second adjacent to the other end of the element and a third half-way along the length of the element, and it may also contain two auxiliary supports, one located between, e.g., mid-way between, the first and second fuel pin supports and the other located between, e.g., mid-way between, the second and third fuel pin supports.

The pins (i.e., active or dummy pins) and the elongate members may be fixed, i.e., welded or mechanically fastened, to the first fuel pin support which in use is the bottom support.

In the element according to the present invention the axial rod may be fixed, e.g., welded or mechanically fastened, to the pin supports and the auxiliary supports.

According to the present invention in a second aspect there is provided a support cage for nuclear fuel pins to form a fuel element according to the first aspect which comprises a plurality of fuel pin supports defining an axis passing through the supports, a plurality of elongate members extending parallel to the axis connecting the supports, the supports having apertures to locate fuel pins inside the elongate members. Preferably, the support cage has an axial rod having end caps provided thereon, e.g., as described above.

According to the present invention in a third aspect there is provided a nuclear reactor core including a moderator material block having channels formed therethrough, at least one of the channels incorporating a row or assembly of fuel elements each according to the first aspect of the present invention.

Embodiments of the present invention will now be described by way of example with reference to the accompanying drawings.

DETAILED DESCRIPTION OF THE INVENTION

Figure 1:
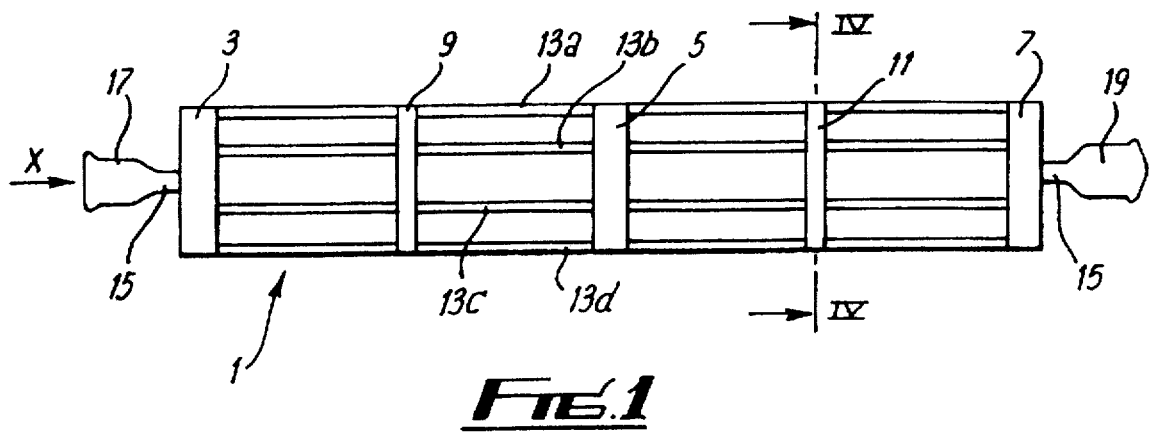
FIG. 1 is a side view of a nuclear fuel element.
Figure 2:
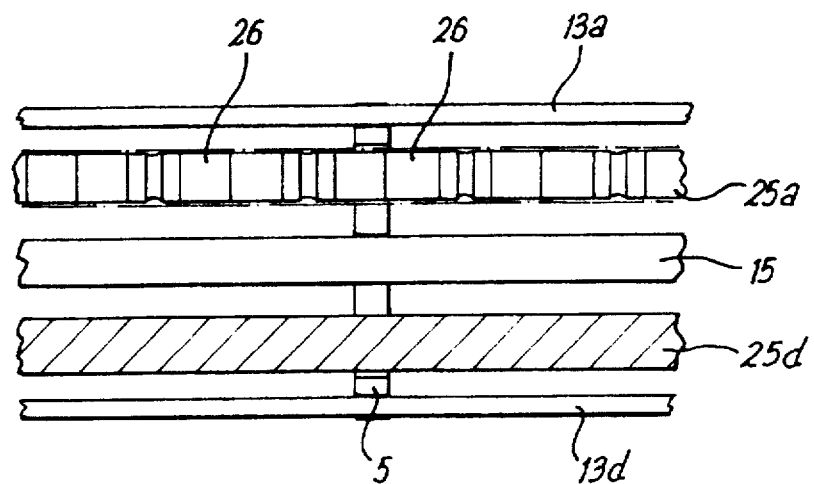
FIG. 2 is a sectional side view (on the line II—II in FIG. 3) showing more detail of part of the element shown in FIG. 1.
Figure 3:
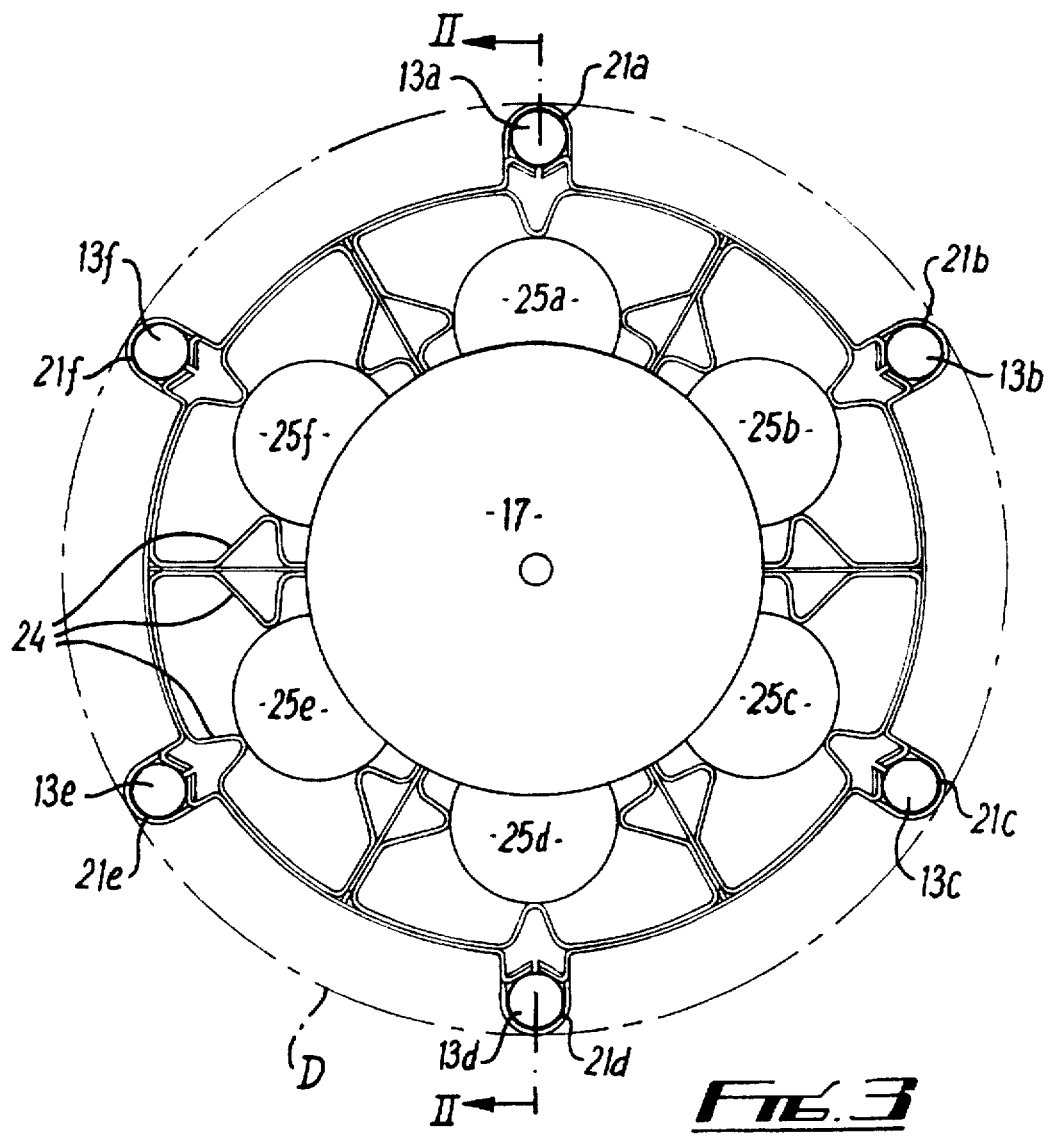
FIG. 3 is an end view in the direction X in FIG. 1 of one of the fuel pin supports shown therein.

FIG. 1 shows a cage structure 1 to provide a support and containment for nuclear fuel pins containing uranium oxide pellets of the AGR type. For simplicity the fuel pins and inner parts of the cage structure 1 are omitted in FIG. 1 but are shown in FIGS. 2 and 3. The cage structure 1 comprises fuel pin supports 3, 5 and 7 and auxiliary supports 9 and 11. The supports 3 and 7 are adjacent to the respective ends of the cage structure 1 and the support 5 is mid-way along the length of the structure 1. The auxiliary supports 9 and 11 are positioned mid-way between the supports 3 and 5 and mid-way between the supports 5 and 7 respectively.

Tubular support rods 13a, 13b, 13c, 13d, 13e and 13f (only four shown in FIG. 1) extend along the length of the structure 1. As seen in FIGS. 2 and 3, the rods 13a to 13f are disposed around a circumferential arc at the periphery of the structure 1. The rods 13a to 13f which may be made of stainless steel or preferably zirconium alloy are fitted through apertures in the supports 3, 5, 7, 9 and 11 and are fastened to the support 7 (by means not shown). They are supported but not fastened at other positions.

The cage structure 1 has an axial tubular rod 15 having at its respective ends caps 17, 19 described in detail below with reference to FIGS. 5 and 6.

FIG. 2 shows the geometrical relationship of pins to the cage structure 1. The pins comprise three active fuel pins 25a, 25c and 25e alternating with dummy pins 25b, 25d and 25f (FIG. 3). Only one of each type of pin is shown in FIG. 2, viz the pins 25a and 25d. Individual uranium oxide fuel pellets 26 inside the pin 25a are shown in FIG. 2. The pins 25a to 25f are located inside the ring of support rods 13a to 13f around an arc of smaller diameter, the pins 25a to 25f being equidistantly spaced (as seen in FIG. 3).

The pins 25a to 25f are fitted through the supports 3, 5, 7 (5 only shown in FIG. 2) and fastened to the support 7. The rod 15 is seen in FIG. 2 to extend axially along the fuel element and is welded to the supports 3, 5, 7, 9 and 11 (5 only shown in FIG. 2).

An end view of one of the fuel pin supports, i.e., the support 3, is given in FIG. 3. The support 3 is a spider-type construction formed of hardened strip metal such as stainless steel. The widest diameter of the construction is indicated by broken line D and is reached at six ring projections 21a, 21b, 21c, 21d, 21e and 21f providing apertures through which the tubular support rods 13a to 13f are fitted so that in practice the rods 13a to 13f may define the outer envelope of the cage structure 1 of diameter approximately equal to D.

The axially extending pins 25a, 25b, 25c, 25d, 25e and 25f are fitted through apertures provided by the support 3, each aperture being defined by a set of four pin locating projections 24, pointing inward to the center of the aperture, two of the projections 24 pointing circumferentially and two pointing radially in each set. Only one radially pointing projection in each set is shown in FIG. 3 in addition to the two circumferentially pointing projections 24. Each pin is in contact with the projections 24 defining the pin aperture.

As an example, three of the pins, e.g., pins 25a, 25c and 25e may be active pins alternating with three dummy pins, e.g., pins 25b, 25d and 25f, made for example of solid zirconium alloy.

The fuel pin support 5 (FIG. 1) is similar in construction to the support 3 shown in FIG. 3. The pins 25a to 25f and the rods 13a to 13f may be attached, e.g., by welding or mechanical fastening, to the support 7.

Figure 4:
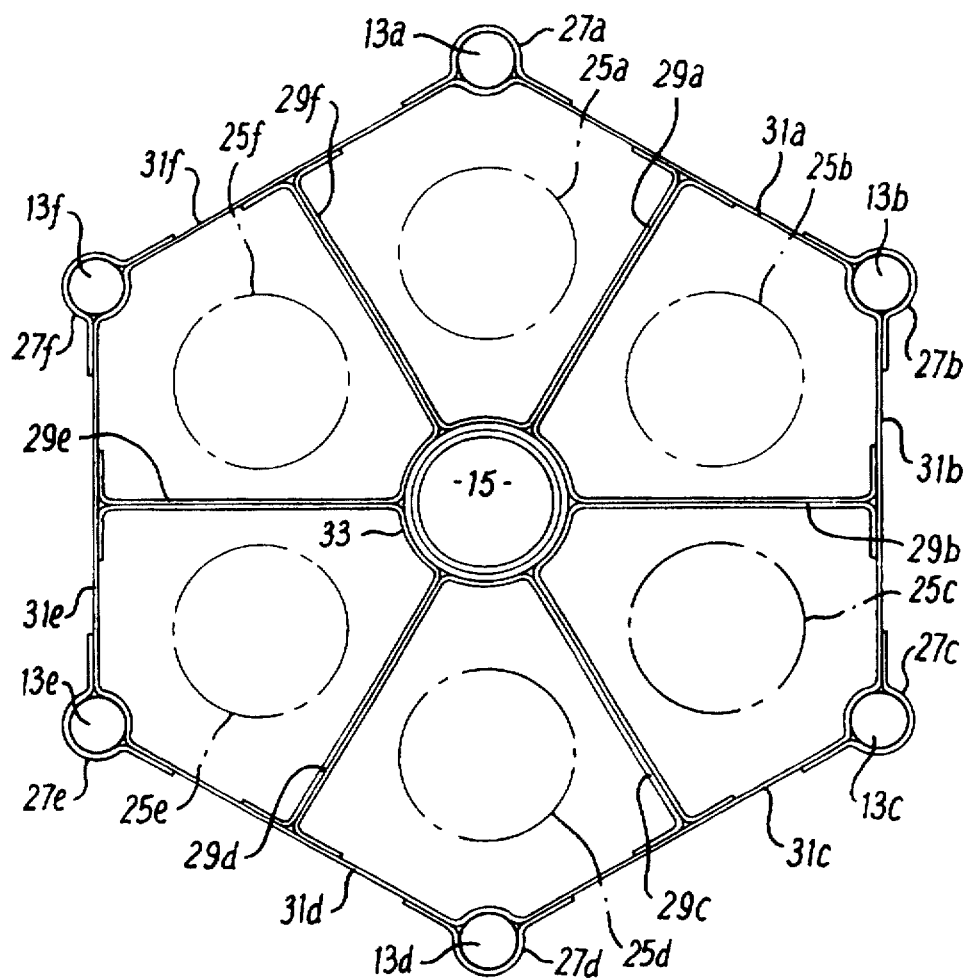
FIG. 4 is a sectional end view on the line IV—IV in FIG. 1 of one of the auxiliary supports shown therein.

FIG. 4 shows one of the auxiliary supports, support 11. In this case, the support is employed to support only the rods 13a to 13f. The support is again spider-like construction formed of strip metal or machined from solid metal, e.g., stainless steel, but in this case the support 11 contains a number of portions which are straight sided (although they could alternatively be curved), viz radial portions 29a to 29f and peripheral portions 31a to 31f forming together a straight sided regular hexagon. The rods 13a to 13f pass through outer rings 27a to 27f. The pins 25a to 25f pass through gaps formed between the radial portions 29a to 29f and the peripheral portions 31a to 31f. The pins 25a to 25f are indicated in broken line outline in FIG. 4. The axial rod 15 is supported by and welded to a strengthened ring 33 at the center of the construction.

The auxiliary support 9 (FIG. 1) is similar to the auxiliary support 11.

Figure 5:
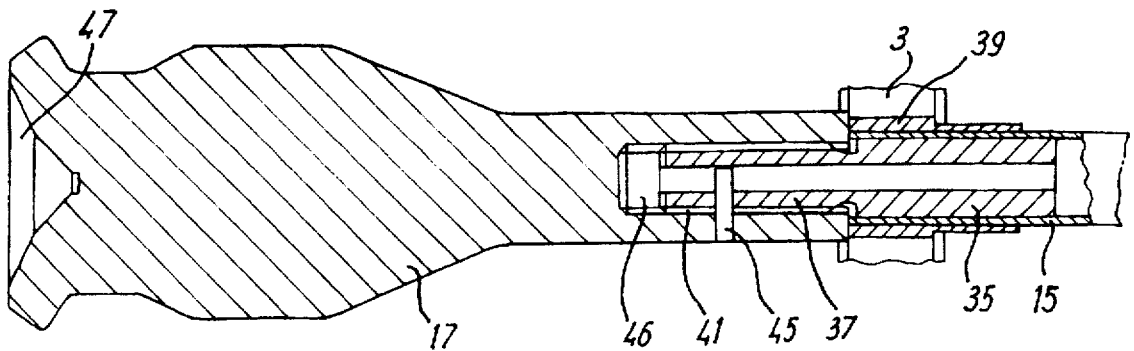
FIG. 5 is a sectional side view (on the line II—II in FIG. 3) showing more detail of one end of the element shown in FIG. 1.

FIG. 5 shows one end of the axial tubular rod 15. The rod 15 is located in-the support 3 by a sleeve 39. A tubular plug 35 is initially fitted and welded inside the rod 15 at its end. The plug 34 has a stepped cross-section having a larger diameter portion 35 inside the rod 15 and a smaller diameter projection 37 extending beyond the rod 15. The projection 37 has a male screw thread 41. The cap 17 having a bore 46 with a female screw thread is attached to the thread 41 and is locked thereon by a dowel pin 45 in a locating hole which extends through the cap 17 into the body of the projection 37. The cap 17 has at its end a conical dished recess 47 to facilitate receipt of a mating cap (of the type shown in FIG. 6) of the opposite end of another similar fuel element (not shown).

Figure 6:
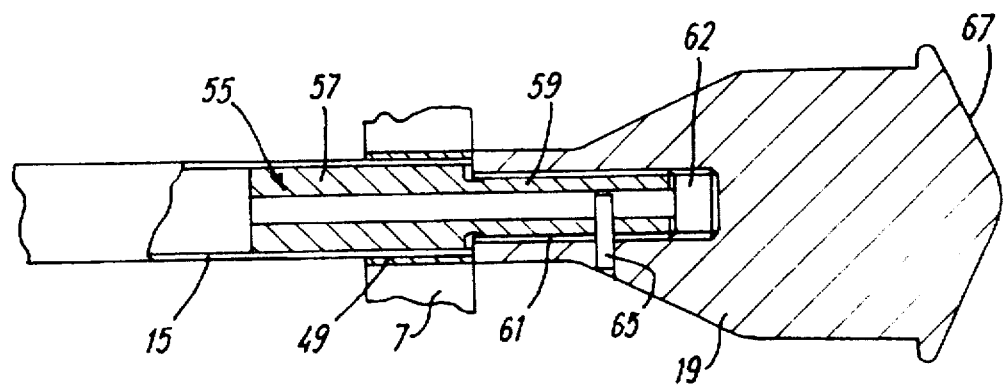
FIG. 6 is a sectional side view (on the line II—II in FIG. 3) showing more detail of the other and of the element shown in FIG. 1.

FIG. 6 shows the other end of the axial tubular rod 15. The rod 15 is located in the support 7 by a sleeve 49. A tubular plug 55 is initially fitted and welded inside the rod 15 at its end. The plug 55 has a stepped cross-section having a larger diameter portion 57 inside the rod 15 and a smaller diameter projection 59 extending beyond the rod 15. The projection 59 has a male screw thread 61.

The cap 19 having a bore 62 is attached by a female screw thread in the bore 62 to the male screw thread 61. The cap 19 is locked on the projection 59 by a dowel pin 65 in a locating hole which extends through the cap 19 into the body of the projection 59. The cap 19 has at its end a male conical portion 67 which facilitates location in the end cap (of the type shown in FIG. 5) of the opposite end of another similar fuel element (not shown).

In use, an assembly or row of fuel elements (up to eight elements) as shown in FIGS. 1 to 6 is formed with the elements abutting one another in end-to-end relationship when fitted into the channel 28 of a moderator core (indicated schematically by hatching 30 in FIG. 3) of a Magnox reactor. Each element is loaded and discharged into the channel individually to make up a channel stack of up to 8 elements.

While various embodiments of the present invention have been described in detail, it is apparent that modifications and adaptations of the embodiments will occur to those skilled in the art. Such modifications and adaptations are considered to be within the spirit and scope of the present invention.

What is claimed is:

1. A nuclear fuel element for use in a gas cooled nuclear reactor, the fuel element comprising:

a plurality of fuel pin supports defining a fuel element axis passing through said supports, said fuel pin supports allowing the passage of coolant gas flow therethrough;

a central support rod coincident with said axis and passing through said fuel pin supports;

a plurality of fuel pins suspended between said supports and extending substantially parallel to said element axis, each fuel pin consisting of a metal tube having metal oxide fuel pellets therein; and a plurality of elongate members connected between said supports, said elongate members extending parallel to said axis, being disposed around said fuel pins and forming an open cage structure allowing the passage of coolant gas therethrough.

2. An element as in claim 1 wherein said supports are fixed to said central support rod.

3. An element as in claim 1 and wherein said elongate members comprise tubular rods.

4. An element as in claim 3 and wherein one or more of said tubular rods incorporate doping material.

5. An element as in claim 4 and wherein said doping material comprises gadolinia.

6. An element as in claim 1 and wherein said fuel pin supports comprise strips made from strip material, the sides of said strips being parallel to said element axis, said strips defining apertures adapted to receive said fuel pins and apertures adapted to receive said elongate members.

7. An element as in claim 6 wherein said support members are such that said apertures receiving said elongate members are adjacent to said periphery of said support structure and said apertures being constituted by rings forming projections at the support periphery.

8. An element as in claim 1 and wherein said fuel pin supports are adapted to accommodate from three to six of said fuel pins.

9. An element as in claim 8 and wherein said fuel pin supports comprise six apertures substantially equispaced on an arc around said element axis to receive said fuel pins.

10. An element as in claim 8 and wherein said fuel pins incorporated in said element comprise active fuel pins containing fissile material and at least one dummy pin containing substantially no fissile material.

11. An element as in claim 10 and wherein said at least one dummy pin is made of solid metal.

12. An element as in claim 11 and wherein said metal is a zirconium alloy.

13. An element as in claim 8 and wherein said element comprises six of said elongate members.

14. An element as in claim 1 wherein said central support rod comprises complementary formations on its ends which permit location of one element against another on their axis to form a row of abutting elements.

15. An element as in claim 14 and wherein the respective ends of said rod comprise end-cap portions having complementary male and female mating surfaces.

16. An element as in claim 15 and wherein said mating surfaces are conical.

17. An element as in claim 15 and wherein said end caps are attached to said rod by screw threads.

18. An element as in claim 17 and wherein each of said end caps is locked in position on said rod by a locking pin.

19. An element as in claim 1 and which comprises at least one auxiliary support to further support said elongate members.

20. An element as in claim 19 wherein said element includes three fuel pin supports, a first fuel pin support adjacent to one end of said element, a second fuel pin support adjacent to the other end of said element and a third fuel pin support about half-way along the length of said element, said element also including two auxiliary supports, one located between said first and third fuel pin supports and the other located between said second and third fuel pin supports.

21. An element as in claim 20 and wherein said fuel pins and said elongate members are fixed to said first fuel pin support and are supported by said second and third fuel pin supports and said elongate members are also supported by the auxiliary supports.

22. A support cage for receiving and retaining fuel pins to constitute a nuclear fuel element for use in a gas cooled nuclear reactor, the fuel element comprising:

a plurality of fuel pin supports defining an axis passing through said supports, said supports supporting said fuel pins, which extend substantially parallel to said axis, each fuel pin consisting of a metal tube having metal oxide fuel pellets therein, said fuel pin supports allowing the passage of coolant gas flow therethrough;

a central support rod coincident with said axis and passing through said fuel pin supports;

a plurality of elongate members connected between said supports, said elongate members extending parallel to said axis, being disposed around said fuel pins and forming an open structure allowing the passage of coolant gas therethrough.

23. A nuclear reactor core including a moderator material block having channels formed therethrough, at least one of said channels incorporating a row or assembly of fuel elements each according to the claim 1.

24. A nuclear reactor core as in claim 23 and which is of the Magnox reactor type.

* * * * *